May 18, 1965   F. S. MACKLEM   3,184,675
GATED CONTROL FOR POWER CIRCUIT
Filed July 11, 1960   3 Sheets-Sheet 1

*INVENTOR.*
F. SUTHERLAND MACKLEM
BY Roy C. Hopgood
ATTORNEY

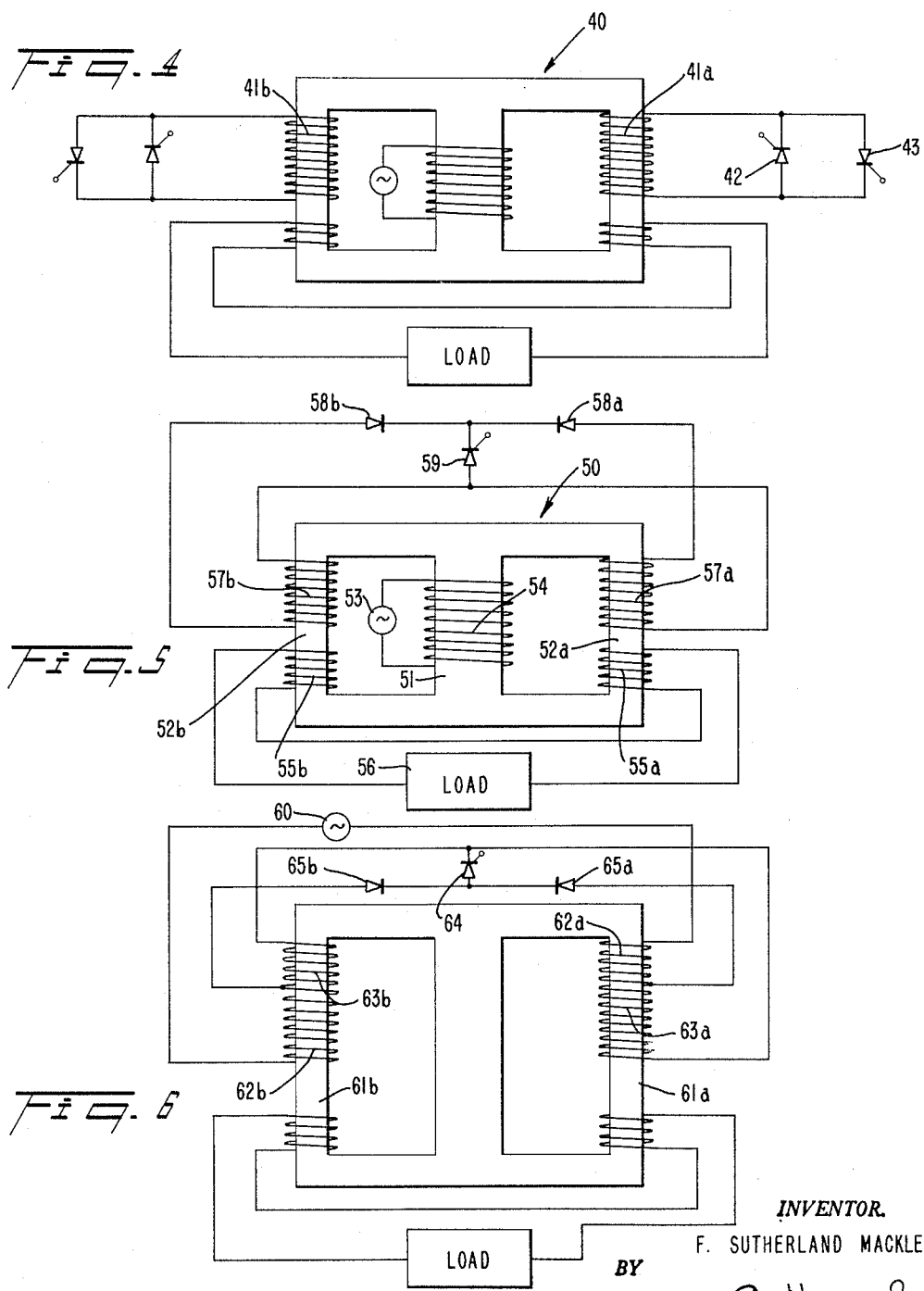

May 18, 1965  F. S. MACKLEM  3,184,675
GATED CONTROL FOR POWER CIRCUIT
Filed July 11, 1960  3 Sheets—Sheet 3

INVENTOR.
F. SUTHERLAND MACKLEM
BY Ray C. Hopgood
ATTORNEY United States Patent Office 3,184,675
Patented May 18, 1965

3,184,675

GATED CONTROL FOR POWER CIRCUIT

F Sutherland Macklem, 12 Gower Road, New Canaan, Conn.

Filed July 11, 1960, Ser. No. 42,145
7 Claims. (Cl. 323—50)

The present invention, generally, relates to devices such as saturable reactors, transformers, magnetic amplifiers and variable reluctance amplifiers. More particularly, the present invention relates to gated control circuits for these various devices.

In the past, control circuits for A.-C. power systems have required the dissipation of considerable power within themselves. This was not a serious disadvantage in low power systems, but as power levels are increased, the power loss in the control circuits becomes increasingly significant.

For example, with power control circuits heretofore known, the power loss is approximately 25 percent of the total power level, and when the power level is increased above, for example, a hundred watts, a serious heat dissipation problem arises in the control circuit. As the power level is increased, the impedance control elements which have been used in the past become very large and massive in order to withstand the heat which they develop.

Accordingly, it is an object of the invention to provide a control circuit which reduces internal power dissipation to a minimum.

Another object of the invention is to provide a new and improved electrical circuit to control power delivered to a load.

Still another object of the invention is to provide a new and improved electrical circuit which admits of a reversible control for power delivered to a load.

A further object of the invention is to provide a circuit to control relatively large amounts of electrical power without excessive power loss.

A still further object of the invention is to provide a new and improved electrical circuit to achieve transformer matching between a source of electrical energy and a load.

Briefly, the invention contemplates a circuit to control A.-C. power transferred electro-magnetically from a primary winding to at least one secondary winding. At least one magnetic flux path which couples the primary and secondary windings is looped by a control winding having turns which, when shorted, increase the reluctance of that path to prevent electro-magnetic coupling between the primary and secondary windings. In accordance with the invention, a control circuit includes the control winding and at least one solid state gating element.

Other objects and advantages of the invention will be pointed out in the following description and claims and illustrated in the accompanying drawings which disclose by way of example the principle of the invention and the best modes which have been contemplated of applying that principle.

In the drawings:

FIG. 1 is a diagrammatic illustration of a power circuit having a center tapped winding in a control circuit with four solid state gating elements;

FIG. 2 is an illustration of a power circuit having a center tapped control winding in a control circuit with two solid state gating elements;

FIG. 3 is an illustration of a power circuit similar to that shown in FIG. 2 having a control circuit without a center tapped winding;

FIG. 4 is an illustration of a modification of the circuit shown in FIG. 3;

FIG. 5 is an illustration of a modified control circuit having only one solid state gating element;

FIG. 6 is an illustration of a further modification of the previously shown control circuits with the control windings being tapped portions of the primary winding;

FIG. 7 is an illustration of a still further modification of the previously shown control circuits with the control winding being tapped portions of the secondary windings; and FIG. 8 is a curve showing another form of operation for the control circuit of the invention.

The solid state elements referred to in connection with the description of the invention are relatively new controlled rectifiers, sometimes called Silicon Controlled Rectifiers, or just plain SCR's. These controlled rectifiers are like electrically controlled switches, and like switches, they have just two states: either open or closed. In fact, the two states of silicon controlled rectifiers available today approach ideal open and closed circuits so closely that in accordance with the present invention they can control seven kilowatts of electrical power while dissipating no more than twenty-five watts themselves.

With these controlled rectifier elements, A.-C. power control is accomplished in accordance with the invention by closing them only for a portion of each half cycle of A.-C. power so that the duty factor (or angle of current flow per half cycle) is controlled. In this way, A.-C. power to a load is controlled without the dissipation of appreciable power in the control elements.

Although the availability of solid state controlled rectifier elements permit the preferred circuit arrangement in accordance with the invention, they are expensive elements, and therefore, it is important also to use them efficiently. In accordance with the invention, optimum efficiency is achieved, because the controlled rectifier is operated at its most efficient voltage and current level.

The power that can be controlled by a solid-state switching element is determined by the product of the peak voltage E it can withstand in the non-conducting state and the peak current I it can pass in the conducting state. In the sinusoidal case the power that can be controlled is ½EI watts. It is an object of the invention to provide means so that this power can be delivered to a load at any other voltage E′ and current I′, where the product E′I′ does not exceed EI. In other words, the switching element is matched to the load requirements.

Referring now to the basic form of the invention as illustrated in FIG. 1 of the drawings, a magnetic core 10 is provided with three legs: a center leg 11 and two outer legs 12a and 12b. Although it is not essential, the center leg 11 is formed with twice the cross sectional area as either one of the outer legs 12a and 12b. This is because it is difficult to purchase laminations with equal size legs on the open market.

A suitable source of alternating electric current 13 is connected to a primary winding 13a wound about the center leg 11. By this means, magnetic flux developed in the center leg 11 by electric current in the winding 13a will divide approximately equally between the two outer legs 12a and 12b. Under these conditions, the secondary or output windings 14a and 14b wound on the outer legs 12a and 12b, respectively, will develop voltages which are equal in magnitude, but since the windings are connected in series opposing to the load 15, no voltage will appear across the load and, therefore, no electric current will flow in a load 15 connected between the two output windings 14a and 14b.

Figure 1:
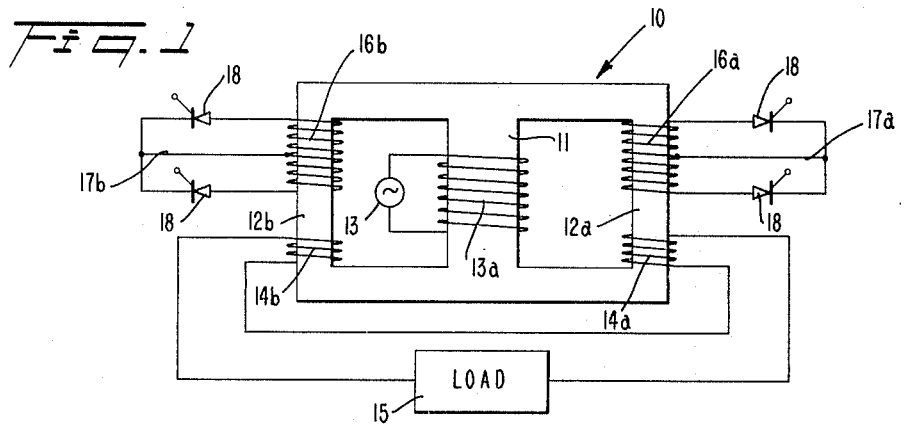

Also wound on each of the outer legs 12a and 12b is a control winding, identified in FIG. 1 by the numerals 16a and 16b, respectively, and each of these control windings has a center tap 17a and 17b, respectively. An SCR switching element 18 is connected from the center tap 17a, or 17b, to each end of the control winding 16a and 16b.

As may be seen in FIG. 1 now, the two halves of the control winding 16a will be shorted completely (i.e., for both half-cycles of A.-C.) by "firing" (rendering conductive) the two SCR's connected between its ends and the center tap 17a. The shorting of the winding 16a increases the magnetic reluctance of the path through the outer leg 12a (represented by a value $R_0$) to a value represented by $R_1$, and the magnetic flux developed in the center leg 11 now will pass entirely in the other outer leg 12b.

The value $R_1$ is given by the relationship:

$$R_1 = WN^2Y$$

where W is the frequency in radians of the applied A.-C., N is the number of turns of the winding 16a, and Y is the ratio of current to voltage in the winding 16a. If Y is large (i.e., if the SCR's provide a good short and the conductance of the winding is high) then $R_1$ will be high and most of the primary flux will be forced into the other leg 12b.

The source of electric current 13 may be applied continuously through the primary winding 13a to develop magnetic flux in the center leg 11. If no power is desired at a particular time for the load 15, none of the SCR's 18 are rendered conductive so that the magnetic flux divides equally between the two outer legs 12a and 12b. Therefore, as explained previously, the voltages developed in the output windings 14a and 14b are equal, and no voltage is developed across the load 15. In general, the voltage $E_L$ across the load is equal to the difference $e_b - e_a$ between the voltage $e_a$ developed in the output winding 14a and the voltage $e_b$ developed in the output winding 14b.

To transmit power to the load 15, one of the SCR's 18 is rendered conductive, thus shorting one-half of a control winding, for example winding 16a, for one-half cycle or some portion thereof. For that half cycle, due to the high reluctance through winding 16a, flux that would have passed through winding 16a is forced to pass through winding 16b. Thus voltage $e_a$ developed by the secondary winding 14a is reduced while the voltage $e_b$ developed by the secondary winding 14b is increased correspondingly. The difference voltage $E_L = e_b - e_a$ is then no longer zero, and this voltage appears across the load 15.

During the next half cycle, the other half of the winding 16a is short, and the same conditions prevail to develop the output voltage $E_L$ across the load 15. Further advantages of a gated control in accordance with the invention will be set forth in further detail presently.

Figure 2:
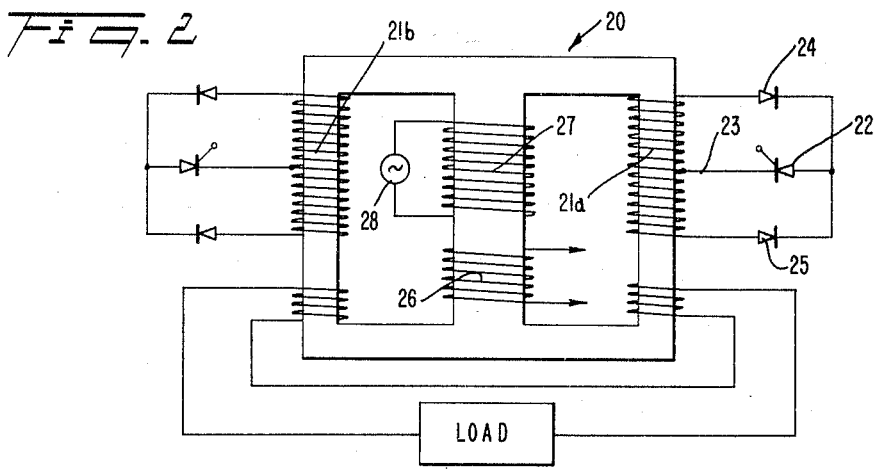

Referring now to FIG. 2 of the drawings, it may be considered in some instances that due to the expense of an SCR, an arrangement as shown in FIG. 2 may be used since only a single SCR is required in the control circuit. The core 20 in FIG. 2 is substantially the same as that discussed above for FIG. 1, and the control windings 21a and 21b are substantially the same as previously described. A principal distinction between the arrangement shown in FIG. 2 over that shown in FIG. 1 is that a single SCR 22 is connected in series with the center tap 23, and two ordinary rectifiers 24 and 25 are connected in series with opposite ends of the winding 21a.

To operate the circuit shown in FIG. 2, it is necessary to render the SCR 22 conducting during each half cycle for full wave operation, whereas in FIG. 1 a separate SCR is used for each half cycle.

A further distinction between the arrangement shown in FIG. 2 over that shown in FIG. 1 is the provision of an additional secondary winding 26 wound on the center leg adjacent the primary winding 21. The magnetic flux in the center core leg remains constant, and therefore, this center leg can be used as an ordinary power transformer for stepping down or stepping up the voltage from the A.-C. power source 28 connected to the primary winding 27. As another example of using the center core leg as an ordinary transformer, the primary winding on the center core leg may be center tapped and used as a Scott T in a three phase to two phase A.-C. control system.

Also, the configuration shown in FIGS. 1 and 2 provides some power gain due to core material nonlinearity. For example, when a control winding is shorted the preceding half cycle of magnetic flux in the core has left the core magnetized in which direction it happened to flow. Shorting the control winding during the next succeeding half cycle, prevents reset flux from flowing therein. Therefore, the core in that particular leg remains partially magnetized in one direction and presents a higher reluctance in that direction which means that part of the reluctance change comes from the nonlinearity of the core material.

Figure 3:
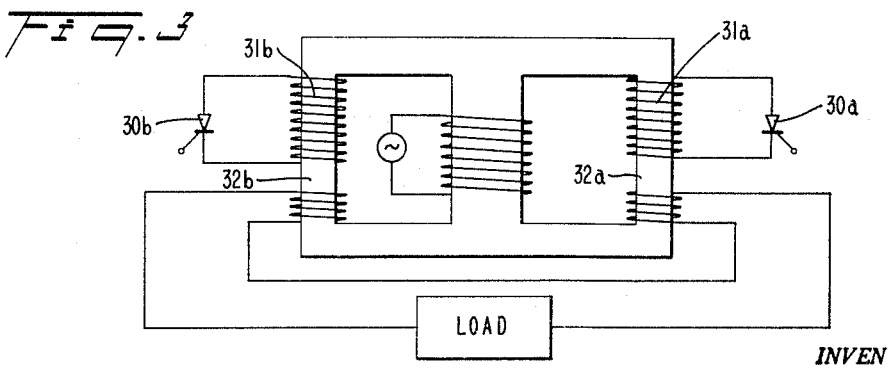

The arrangement shown in FIG. 3 of the drawing takes advantage of core saturation and provides a single SCR 30a and 30b across the control windings 31a and 31b, respectively. Therefore, the windings 31a and 31b can be shorted in one direction only. If one of the control windings, winding 31a for example, is shorted, magnetic flux flows in the core leg 32a on alternate half cycles and always in the same direction.

As as result of magnetic flux being always in one direction (or polarity), the core quickly saturates and permits no further flux in that direction. Flux in the other direction through leg 32a continues to be blocked by the control winding 31a so that all the flux in both directions must flow through leg 32b of the core.

While the circuit arrangement shown in FIG. 3 provides greater power gain due to core nonlinearity than the circuits of either FIG. 1 or FIG 2, it introduces a time delay which, in some cases, may be a disadvantage. Each outer leg 32a or 32b of the core must be capable of carrying approximately twice the quiescent flux without saturating. Therefore, when a control winding is shorted, the preceding half cycle of flux cannot have taken the core more than halfway toward saturation. At least one more half cycle is required to complete the saturation. Thus, there can be a time delay of one and a half cycles before the flux is fully diverted to the other leg.

An arrangement which overcomes the above referred to time delay is illustrated in FIG. 4 of the drawings. The core 40 is arranged somewhat similarly to those described previously above, but the control windings 41a and 41b have two SCR's connected in parallel "back-to-back" across the ends of each respective winding.

For example, winding 41a has SCR 42 and SCR 43 connected in parallel thereacross. The polarities of these two SCR's 42 and 43 are opposite each other so that the operation of the control circuit is substantially the same as that described in connection with FIG. 1.

An arrangement to provide further economy is achieved with a circuit as shown in FIG. 5 of the drawings. In FIG. 5 the core 50 has a center leg 51 and two outer legs 52a and 52b. A power source 53 is connected to the primary winding 54 on the center leg 51 as has been described heretofore.

Output windings 55a and 55b are coupled with leg 52a and 52b, respectively, and a load 56 is connected with both of these output windings. The two control windings 57a and 57b are connected in parallel with each other through ordinary rectifiers 58a and 58b in series with this connection. The polarity of each rectifier 58a and 58b is such that current is directed toward each other as shown in FIG. 5. An SCR 59 is connected between the two ordinary rectifiers 58a and 58b and to the opposite connection between the two control windings.

Therefore, with an arrangement as shown in FIG. 5, a single SCR 59 shorts one control winding or the other depending upon which half cycle it is rendered conducting or "fired." The control windings 57a and 57b, therefore, must be connected in series aiding, and the ordinary rectifiers 58a and 58b are connected back-to-back to prevent current flow from one control winding to the other winding. The SCR, therefore, is connected so that full wave rectified d-c appears across it.

The SCR will conduct on either of the half cycles of primary A.—C., and if it is "fired" to conduct on positive half cycles, it will short one control winding during these half cycles. Conversely, if the SCR is "fired" on the alternate half cycles, it will short the other control winding during the intermediate half cycles. Core saturation is relied upon the complete the flux diversion.

Of course, it is not esesntial that the source of electrical potential and the primary winding be connected with the center leg of the core. As seen in FIG. 6 of the drawings, the power source 60 may be applied to the outer legs 61a and 61b by tapping a portion 62a and 62b of the control windings 63a and 63b. In FIG. 6, the SCR 64 and the ordiary rectifiers 65a and 65b are connected similarly as described above in FIG. 5.

Figure 7:
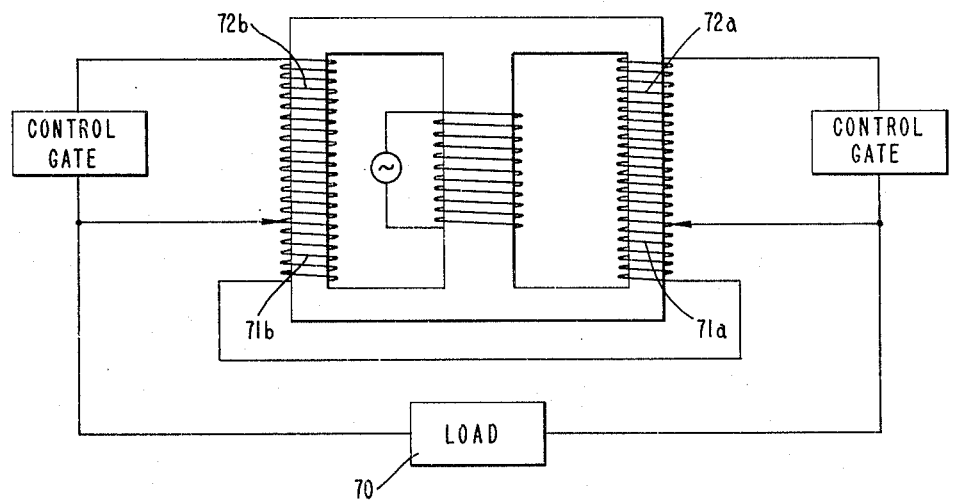

An alternative arrangement from that shown in FIG. 6 is illustrated in FIG. 7 of the drawings where a load 70 is connected to output windings 71a and 71b which windings, in turn, are tapped turns of control windings 72a and 72b.

In all circuits previously described, the center core leg is shown twice the size of the outer core legs, but this is merely because standard transformer cores are available constructed in this manner. It should be understood, therefore, that the center leg need not be any larger than the outer legs. Also, it is understood that the load and the source can be interchanged in position without effecting the arrangement in accordance with the invention.

Further, the center core leg may be formed by adacent legs of two, separate cores as will be evident to one skilled in the art.

Figure 8:
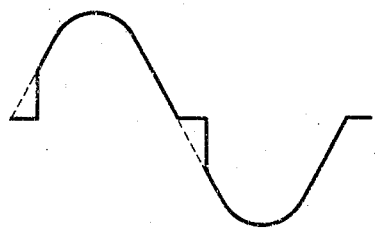

In FIG. 8 of the drawings, curves are shown tio illustrate the wave forms of alternating current as controlled by the control circuit principle of the invention. Since the control circuit is a gating arrangement, the shape of the current pulse is controllable to deliver electric current of a desired wave form to a load. Further, the shape of the current pulse may be controlled in width as illustrated in FIG. 8. If desired, the width of the current pulse may be reduced to an extremely small value so that, in effect, sharp pulses of current are delivered to a load.

While the invention has been shown and described in various illustrative embodiments, it is understood that these embodiments are only for illustrative purposes, and it is understood that modifications and alterations may be made without departing from the true spirit and scope of the invention as defined in the claims appended hereto.

I claim:

1. A gated control circuit comprising: a pair of flux loops having a common branch; a primary winding coupled to said common branch; means for connecting a source of electrical potential to said primary winding; a pair of secondary windings coupled respectively to said pair of flux loops, tap means connected respectively to each of said primary windings for defining load winding and control winding portions of said secondary windings; means for connecting a load across both said load winding portions; and silicon controlled rectifier means connected respectively across each said control winding portions.

2. A gated control circuit comprising: a pair of flux loops having a common branch; a primary winding coupled to said common branch; means for connecting a source of electrical potential to said primary winding; a pair of output windings respectively coupled to said pair of flux loops; means for connecting a load across both of said output windings; a pair of center tapped control windings coupled respectively to said pair of flux loops; and a silicon controlled rectifier connected between each end of each control winding and the associated center tap, the pair of rectifiers associated with each control winding being oppositely poled.

3. A gated control circuit comprising: a pair of flux loops having a common branch; a primary winding coupled to said common branch; means for connecting a source of electrical potential to said primary winding; a pair of output windings respectively coupled to said pair of flux loops; means for connecting a load across both of said output windings; a pair of center tapped control windings coupled respectively to said pair of flux loops; a rectifier connected between each end of each control winding and the associated center tap, the pair of rectifiers associated with each control winding being oppositely poled; and a silicon controlled rectifier connected in series with each center tap, poled similarly to the associated pair of rectifiers.

4. A gated control circuit comprising: a pair of flux loops having a common branch; a primary winding coupled to said common branch; means for connecting a source of electrical potential to said primary winding; a pair of output windings respectively coupled to said pair of flux loops; means for connecting a load across both of said output windings; a pair of control windings coupled respectively to said pair of flux loops; and a pair of silicon controlled rectifiers respectively coupled across said control windings.

5. A gated control circuit as claimed in claim 4 further comprising a pair of silicon controlled rectifiers connected respectively across the first mentioned silicon controlled rectifiers in opposing polarity thereto.

6. A gated control circuit comprising: a pair of flux loops having a common branch; a primary winding coupled to said common branch; means for connecting a source of electrical potential to said primary winding; a pair of output windings respectively coupled to said pair of flux loops; means for connecting a load across both of said output windings; a pair of control windings coupled respectively to said pair of flux loops; a first electrical connection between one end of said first control winding with the opposite end of said second control winding; a second electrical connection between the opposite end of said first control winding with the one end of said second control winding; a silicon controlled rectifier connected between said two electrical connections; and two rectifier elements in series opposing in one of said electrical connections on opposite sides of said silicon controlled rectifier.

7. A gated control circuit comprising: a pair of flux loops having a common branch; a pair of tapped primary windings respectively coupled to said pair of flux loops; means for connecting a source of electrical potential across both of said primary windings; a pair of output windings respectively coupled to said pair of flux loops; means for connecting a load across both of said output windings; a first electrical connection between primary winding taps; a second electrical connection between one end of one primary winding and one end of the other primary winding; a silicon controlled rectifier connected between said electrical connections; and two rectifier elements in series opposing in one of said electrical connections on opposite sides of said silicon controlled rectifier.

References Cited by the Examiner

UNITED STATES PATENTS

| | | | |
|---|---|---|---|
| 2,614,242 | 10/52 | Stone | 323—86 X |
| 2,685,653 | 8/54 | Arr et al. | 307—88 |
| 2,686,291 | 8/54 | Macklem | 323—50 |
| 2,725,508 | 11/55 | Bailey et al. | 323—86 X |
| 2,939,117 | 5/60 | Brown | 340—174 |

OTHER REFERENCES

"Solid State Thyratron Switches Kilowatts," Electronics (March 28, 1958), pages 52–53.

LLOYD McCOLLUM, *Primary Examiner.*

MILTON O. HIRSHFIELD, *Examiner.*